United States Patent
Liss et al.

(10) Patent No.: US 10,152,441 B2
(45) Date of Patent: Dec. 11, 2018

(54) HOST BUS ACCESS BY ADD-ON DEVICES VIA A NETWORK INTERFACE CONTROLLER

(71) Applicant: Mellanox Technologies Ltd., Yokneam (IL)

(72) Inventors: Liran Liss, Atzmon (IL); Shachar Raindel, Haifa (IL); Shlomo Raikin, Kibbutz Yassur (IL); Adi Menachem, Hod Hasharon (IL); Yuval Itkin, Zoran (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 242 days.

(21) Appl. No.: 15/154,945

(22) Filed: May 14, 2016

(65) Prior Publication Data

US 2016/0342547 A1    Nov. 24, 2016

Related U.S. Application Data

(60) Provisional application No. 62/162,854, filed on May 18, 2015.

(51) Int. Cl.
  *G06F 13/00*    (2006.01)
  *G06F 13/38*    (2006.01)
  (Continued)

(52) U.S. Cl.
  CPC ............ *G06F 13/385* (2013.01); *G06F 13/28* (2013.01); *G06F 13/4022* (2013.01);
  (Continued)

(58) Field of Classification Search
  CPC .................................................. G06F 13/385
  See application file for complete search history.

(56) References Cited

U.S. PATENT DOCUMENTS

| 8,006,297 B2 | 8/2011 | Johnson et al. |
| 8,103,785 B2 | 1/2012 | Crowley et al. |

(Continued)

OTHER PUBLICATIONS

Netronome Systems, Inc., "Open vSwitch Offload and Acceleration with Agilio® CX SmartNICs", White Paper, 7 pages, Mar. 2017.

(Continued)

*Primary Examiner* — Tammara R Peyton
(74) *Attorney, Agent, or Firm* — D.Kligler IP Services Ltd.

(57) ABSTRACT

Peripheral apparatus for use with a host computer includes an add-on device, which includes a first network port coupled to one end of a packet communication link and add-on logic, which is configured to receive and transmit packets containing data over the packet communication link and to perform computational operations on the data. A network interface controller (NIC) includes a host bus interface, configured for connection to the host bus of the host computer and a second network port, coupled to the other end of the packet communication link. Packet processing logic in the NIC is coupled between the host bus interface and the second network port, and is configured to translate between the packets transmitted and received over the packet communication link and transactions executed on the host bus so as to provide access between the add-on device and the resources of the host computer.

24 Claims, 3 Drawing Sheets

(51) Int. Cl.
  *G06F 13/42* (2006.01)
  *G06F 13/28* (2006.01)
  *H04L 12/861* (2013.01)
  *G06F 13/40* (2006.01)
  *H04L 12/935* (2013.01)

(52) U.S. Cl.
  CPC ...... *G06F 13/4282* (2013.01); *H04L 49/3009* (2013.01); *H04L 49/9068* (2013.01)

(56) References Cited

U.S. PATENT DOCUMENTS

| | | |
|---|---|---|
| 8,824,492 B2 | 9/2014 | Wang et al. |
| 8,964,554 B2 * | 2/2015 | Petry .................. H04L 63/0272 370/235 |
| 2003/0023846 A1 | 1/2003 | Krishna et al. |
| 2004/0057434 A1 | 3/2004 | Poon et al. |
| 2004/0158710 A1 | 8/2004 | Buer et al. |
| 2005/0102497 A1 | 5/2005 | Buer |
| 2009/0086736 A1 | 4/2009 | Foong et al. |
| 2010/0228962 A1 | 9/2010 | Simon et al. |
| 2012/0314709 A1 | 12/2012 | Post et al. |
| 2013/0080651 A1 | 3/2013 | Pope et al. |
| 2013/0263247 A1 | 10/2013 | Jungck et al. |
| 2013/0329557 A1 | 12/2013 | Petry |

OTHER PUBLICATIONS

Stevens., "TCP Slow Start, Congestion Avoidance, Fast Retransmit, and Fast Recovery Algorithms", Request for Comments 2001, 6 pages, Jan. 1997.
U.S. Appl. No. 15/146,013 office action dated Oct. 3, 2017.
PCI Express® Base Specification, Revision 3.1 , 1073 pages, Mar. 2014.
Shirey., "Internet Security Glossary, Version 2", Request for Comments: 4949, 365 pages, Aug. 2007.
Request for Comments 793, "Transmission Control Protocol", DARPA Internet Program Protocol Specification, Information Sciences Institute, 90 pages, Sep. 1981.
Raindel et al., U.S. Appl. No. 15/145,983, filed May 4, 2016.
Raindel et al., U.S. Appl. No. 15/146,013, filed May 4, 2016.
U.S. Appl. No. 15/145,983 office action dated Mar. 7, 2018.
U.S. Appl. No. 15/146,013 office action dated May 18, 2018.

* cited by examiner

HOST BUS ACCESS BY ADD-ON DEVICES VIA A NETWORK INTERFACE CONTROLLER

CROSS-REFERENCE TO RELATED APPLICATION

This application claims the benefit of U.S. Provisional Patent Application 62/162,854, filed May 18, 2015, which is incorporated herein by reference.

FIELD OF THE INVENTION

The present invention relates generally to computer systems, and particularly to communications between a host processor and peripheral devices in a computer system.

BACKGROUND

In most modern computer systems, peripheral devices communicate with the host processor and system memory over a host bus, such as the PCI Express® (PCIe®) bus. Such peripheral devices may include, for example, a network interface controller (NIC), a solid state drive (SSD), and various accelerator modules, such as a graphics processing unit (GPU), and other add-on devices. PCIe offers numerous advantages in communications between the host processor and peripheral devices, including high throughput, reliable performance, advanced error detection and reporting, and native hot-plug functionality, as well as hardware support for input/output (I/O) virtualization.

SUMMARY

Embodiments of the present invention that are described hereinbelow provide new techniques for accessing a host bust by add-on devices, as well as devices implementing such techniques.

There is therefore provided, in accordance with an embodiment of the invention, peripheral apparatus for use with a host computer that includes a host bus and host resources, including a host processor, connected to the host bus. The apparatus includes a packet communication link having first and second ends, and an add-on device, which includes a first network port coupled to the first end of the packet communication link and add-on logic, which is configured to receive and transmit packets containing data over the packet communication link and to perform computational operations on the data. A network interface controller (NIC) includes a host bus interface, configured for connection to the host bus and a second network port, coupled to the second end of the packet communication link. Packet processing logic is coupled between the host bus interface and the second network port, and is configured to translate between the packets transmitted and received over the packet communication link and transactions executed on the host bus so as to provide access between the add-on device and the host resources.

In some embodiments, the NIC includes a third network port, which is configured to convey communications between the host computer and a packet data network while the second network port communicates with the add-on device over the packet communication link.

In another embodiment, the add-on device includes a switch, which is coupled between the first network port and the add-on logic, and is configured to convey communications, transmitted and received via the second network port, between the host computer and a packet data network, while transferring the packets to and from the add-on logic.

In yet another embodiment, the apparatus includes a switch, which includes a third port, which is connected to the first end of the packet communication link; a fourth port, which is connected to communicate with the first port of the add-on device; and a fifth port, which is connected to communicate with another entity over a further packet communication link.

In a disclosed embodiment, the first and second network ports are configured to transmit the packets over the packet communication link in accordance with an Ethernet protocol.

In some embodiments, a range of addresses on the host bus is assigned to the host bus interface, and a sub-range within the assigned range is assigned to the add-on device, and the packet processing logic is configured to translate the transactions on the host bus that are directed to the addresses in the sub-range into corresponding packets for transmission over the packet communication link to the add-on device.

Additionally or alternatively, the host resources include a system memory, and the NIC includes a direct memory access (DMA) engine, which is configured to write and read data to and from the system memory via the host bus, including the data in the packets transmitted from the add-on device over the packet communication link. In a disclosed embodiment, the add-on logic and the packet processing logic are configured to transmit and receive the packets over the packet communication link in accordance with a remote direct memory access (RDMA) protocol, which specifies addresses in the system memory to and from which the data in the packets are to be written and read by the DMA engine.

In some embodiments, the host resources include a system memory, and the packet processing logic is configured to read and execute work items posted in work queues in the system memory by software processes running on the host computer, including at least one queue containing add-on work items specifying operations to be performed by the add-on device, wherein execution of the add-on work items causes the packet processing logic to transmit, over the packet communication link, at least one packet that causes the add-on logic to perform the specified operations.

In one of these embodiments, the at least one queue includes two or more queues containing different, respective add-on work items directed to the add-on device, and the NIC includes scheduling logic, which is configured to transmit the packets corresponding to the work items in the two or more queues in accordance with predefined scheduling criteria. The scheduling criteria may include different, respective levels of quality of service that are assigned to the two or more queues.

Additionally or alternatively, the add-on logic is configured, upon completion of the specified operations, to transmit a reporting message over the packet communication link, and the NIC logic is configured, in response to the reporting message, to post a completion item in a completion queue in the system memory, to be accessed by the software processes running on the host processor. As another alternative, the add-on logic is configured, upon completion of the specified operations, to write a completion status to the system memory using a remote direct memory access (RDMA) protocol.

There is also provided, in accordance with an embodiment of the invention, a computing method, which includes connecting a first network port of an add-on device to a second network port of a network interface controller (NIC) via a packet communication link. A host bus interface of the NIC is connected to a host bus of a host computer including host resources, including a host processor, connected to the host bus. The add-on device receives and transmits packets containing data from and to the NIC over the packet communication link and performing computational operations on the data. The NIC translates between the packets transmitted and received over the packet communication link and transactions executed on the host bus so as to provide access between the add-on device and the host resources.

The present invention will be more fully understood from the following detailed description of the embodiments thereof, taken together with the drawings in which:

DETAILED DESCRIPTION OF EMBODIMENTS

Overview

As noted in the Background section, the PCIe bus offers many useful capabilities in interfacing a peripheral device to a host computer. To take advantages of these capabilities, however, the peripheral device must generally implement its own bus interface, in compliance with the complex requirements of the PCI Express specifications. This implementation is expensive, in terms of design resources and chip real estate, and can consume a substantial fraction of the logic gates that are available in a field-programmable gate array (FPGA) or other integrated circuit that is used in the peripheral device.

Embodiments of the present invention that are described herein provide methods and devices that use the DMA-capable host bus interface (such as a PCIe interface) of a network device, such as a NIC, to serve the I/O requirements of another device, referred to as an add-on device (an FPGA device, for example) that does not have such an interface built into it. Rather than connecting the add-on device directly to the host bus, it is connected by a packet communication link, such as an Ethernet link, to a network port of the network device. The network device translates packets received through the network port from the add-on device into transactions on the host bus, and similarly translates host bus transactions into packets sent through the network port to the add-on device. In some embodiments, another network port of the network device connects to a packet network and thus supports standard network communications by the host computer. Alternatively, the same port of the network device that communicates with the add-on device can be used for network access via the add-on device when the add-on device has an interface to the network.

To operate in accordance with this approach, the add-on device need have only a suitable network interface, such as an Ethernet interface, which is much simpler to implement than a PCIe interface, for example. The add-on device is then able to re-use the efficient bus interface implementation that already exists in the network device, such as using a direct memory access (DMA) engine that is already present in the network device. This technique can be extended to exploit advanced bus-interface technologies, such as Single-Root I/O Virtualization (SR-IOV).

In addition, the add-on device can re-use the software/hardware interface and device model of the network device. For NICs having remote direct memory access (RDMA) capabilities, for example, the add-on device may be served by independent hardware processing queues provided by the NIC, as well as the support built into the NIC for direct, isolated user-space access by software running on a host processor.

Finally, the add-on device can leverage the scheduling capabilities of the network device in serving different hardware processing queues that are exposed through the bus interface of the network device but are associated with the add-on device.

The disclosed embodiments thus obviate the need for the add-on device to implement an independent bus interface (and the costs involved), or in the alternative, to be configured solely as a "bump in the wire" between the network device and the network, without any bus access. The present embodiments instead leverage the advanced bus interface functionality that is already present in contemporary high-performance network devices in order to enable add-on devices to benefit from this functionality at minimal added hardware cost.

In some embodiments of the present invention, the add-on device emulates memory-mapped I/O (MMIO) and DMA bus-master capabilities on the host bus using the bus interface of the network device. Software running on the host processor can perform MMIO writes to an address range that is assigned to the add-on device on the bus interface of the network device, which translates these write operations into packets that it transmits over its packet communication link to the add-on device. MMIO reads by software are accomplished similarly by having the add-on device send back response packets to the network device. The translation between the MMIO operations and packets exchanged with the add-on device is performed by suitable logic in the network device.

DMA reads and writes are accomplished by opening a pre-configured RDMA channel between the add-on device and the network device. The add-on device generates and transmits RDMA read and write packets over its packet communication link to the network device, which translates them into corresponding DMA reads and writes directed to the specified addresses in the system memory. The RDMA channel implementation in the network device can use existing packet processing logic, while the implementation in the add-on device can be simplified, as it operates in a controlled environment, over a single, dedicated link, to and from a single endpoint (the network device). Furthermore, packet flow over the link between the network device and add-on device can be controlled at both ends so as to be lossless, meaning that packets are never dropped other than in severe error conditions. As a result, the RDMA implementation in the add-on device is not required to recover from packet loss. Alternatively, the RDMA reliable transport implementation between the add-on device and the network device may provide further reliability guarantees.

Some embodiments re-use the logical functionality of the host bus interface of the network device in supporting access by host software to the add-on device. Access to the add-on device via the network device may be defined both at the bus-interface level and the programming model level. For example, at the bus-interface level, the add-on device can leverage PCIe bus SR-IOV support that is offered by the network device, as noted earlier, by associating a dedicated control interface in the add-on device with certain packets created by the SR-IOV virtual functions of the network device. For this purpose, the packets generated by a certain SR-IOV virtual function (VF) may be marked with a specific VLAN tag, for example, which is enforced by the network device, and the add-on device may infer the VF from this VLAN tag.

Additionally or alternatively, at the programming model level, the facilities of the network device for supporting protected, direct user-space access to the network device hardware can be leveraged to enable access to the add-on device, as well. In this case, a dedicated control interface on the add-on device is associated with certain packets created by control queues of the network device that are accessed directly by user applications, so that these applications can also have protected, isolated access to the add-on device. The network device handles translation of the virtual address space of the user applications to the appropriate physical memory addresses and vice versa.

Further embodiments make use of the scheduling capabilities of the network device to control and prioritize execution of tasks by the add-on device. For this purpose, multiple hardware objects, such as different queues, of the network device are associated with respective, dedicated control interfaces of the add-on device. The scheduling and arbitration capabilities that are built into the network device may be applied to these objects in supporting differentiation among tasks performed by the add-on device, thus defining multiple levels of quality of service (QoS) in operations of the add-on device. For example, task submission rates on the add-on device may be governed by rate limiters on the corresponding objects in the network device. By the same token, relative scheduling between objects in the network device may be used to provide similar scheduling of tasks on the add-on device. Additionally or alternatively, when the add-on device has a limited number of dedicated control interfaces, multiple queues on the network device may be mapped to the same control interface on the add-device with controlled scheduling.

Although the embodiments described hereinbelow refer, for the sake of concreteness and clarity, to interaction between a NIC and an add-on device in certain particular system configurations and topologies, the principles of the present invention may similarly be implemented using different types of network devices, as well as in other sorts of computer systems.

System Description

Figure 1:
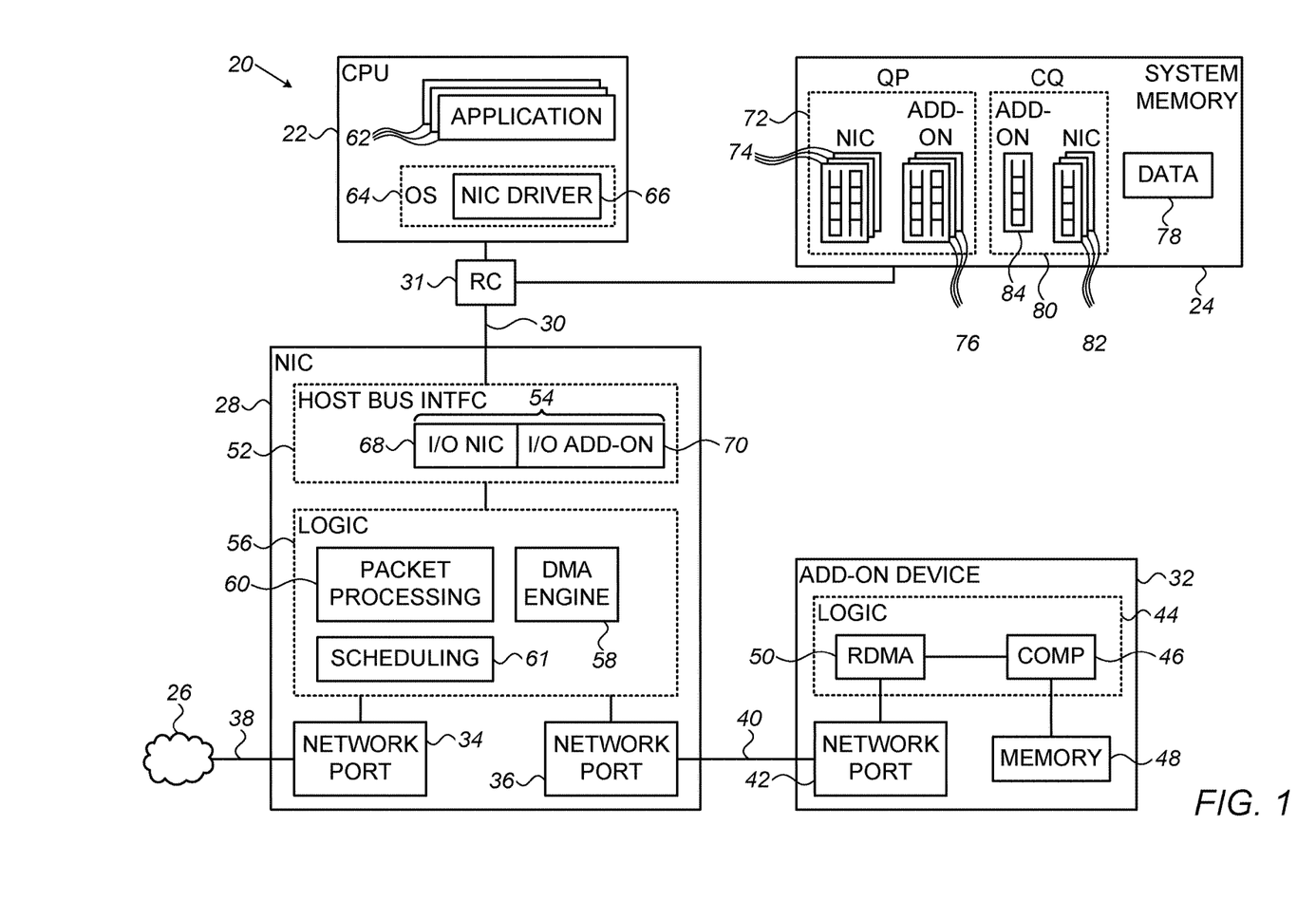
FIG. 1 is a block diagram that schematically illustrates a computer system that includes an add-on device, in accordance with an embodiment of the invention.

FIG. 1 is a block diagram that schematically illustrates a computer system 20, in accordance with an embodiment of the invention. System 20 comprises a host computer, which comprises host resources including a central processing unit (CPU) 22, which serves as the host processor, and a system memory 24, connected to a host bus 30, such as a PCIe bus, via a root complex (RC) 31. (The root complex may be physically integrated with the CPU but is shown here as a separate functional block for the sake of conceptual clarity.) A NIC 28 connected to bus 30 conveys communications between the host computer and a packet data network 26, via a network port 34, which is connected by a network link 38 to network 26. Network 26 may comprise any suitable type of packet network that is known in the art, such as an Ethernet or InfiniBand network.

An add-on device 32 communicates with bus 30 via a packet communication link 40 with NIC 28. For this purpose, add-on device comprises a network port 42, which is coupled to one end of link 40, while the other end of link 40 is coupled to a second network port 36 in NIC 28. Typically (although not necessarily), ports 36 and 42 transmit and receive packets to and from one another over link 40 in accordance with a standard communication protocol, such as an Ethernet protocol, thus simplifying the design of port 42 and enabling flexible interoperability between NIC 28 and various different sorts of add-on devices. Link 40 comprises a physical medium capable of supporting the protocol in use, for example, a suitable copper or fiberoptic cable or suitable traces on a printed circuit backplane to which NIC 28 and device 30 are connected.

System 20, as shown in FIG. 1, represents one example of a topology of connections between host bus 30, NIC 28, network 26 and add-on device 32. Alternative topologies are described hereinbelow with reference to FIGS. 2 and 3. All of these topologies share the feature that the NIC and add-on device are coupled by packet communication link 40 in order to provide access between the add-on device and the host resources on bus 30.

Add-on device 32 comprises add-on logic 44, which receives and transmits packets containing data over packet communication link 40, and which comprises computational logic 46 that performs certain computational operations on the data. Add-on logic 44 comprises hard-wired and/or programmable logic circuits, such as an FPGA. Computational logic 46 can be designed to perform any suitable sort of operations required by system 20, such as cryptographic operations, data compression and/or decompression, or graphics processing, for example.

A device memory 48, within or connected to device 32, holds data that are to be or have been processed by computational logic 46, following reception from link 40 and/or while awaiting transmission over link 40. In some embodiments, add-on logic 44 comprises RDMA logic 50, which handles at least a part of the data transfer over link 40 to and from NIC 28 in accordance with an RDMA protocol. This protocol may be based on existing RDMA protocols that are known in the art, such as InfiniBand or RDMA over Converged Ethernet (RoCE), but its implementation in RDMA logic 50 is simplified, since all RDMA packets are carried over the same link 40 to and from the same endpoint, i.e., network port 36. Furthermore, as noted earlier, network ports 36 and 42 may implement a flow control scheme to ensure that the rates of data transmission to and from add-on device 32 do not overflow the available buffer space, so that lossless packet transmission is guaranteed on link 40.

NIC 28 comprises a host bus interface 52, such as a PCIe interface, which connects to host bus 30, and NIC logic 56, which is coupled between the host bus interface and network ports 34 and 36. NIC logic 56 comprises packet processing logic 60, which translates between the packets transmitted and received over links 38 and 40 and transactions executed on host bus 30. The packet processing capabilities of logic 60 enable processes running on CPU 22 to transmit and receive packets to and from network 26, and in the present embodiment include RDMA support. At the same time, by translating between the packets transmitted and received over packet communication link 40 and transactions executed on host bus 30, packet processing logic 60 provides access between add-on device 32 and the host resources, including processes running on CPU 22 and system memory 24.

DMA Emulation

In the embodiment shown in FIG. 1, NIC logic 56 comprises a DMA engine 58, which writes and reads data directly to and from system memory 24 via host bus 30, as is known in the art. Packet processing logic 60 invokes DMA engine 58 to write the data in RDMA packets received from network 26 through port 34 to the appropriate addresses in memory 24, and similarly to read data from memory 24 for transmission in outgoing packets to network 26. In the present embodiment, DMA engine 58 performs the additional functions of writing data from the packets transmitted from add-on device 32 over packet communication link 40 to memory 24 and of reading data from memory 24 for transmission to add-on device 32. RDMA logic 50 in add-on device 32 is able to specify addresses in system memory 24 to and from which the data in the packets are to be written and read by DMA engine 58. In this manner, add-on logic 44 uses the facilities of NIC logic 56 to emulate DMA operations on bus 30 without having a bus interface or DMA engine of its own.

To emulate a DMA write from add-on device 32 to system memory 24, for example, RDMA logic 50 generates and transmits RDMA write packets via link 40 to a queue in NIC logic 56 that is designated for this purpose. Packet processing logic 60 processes the RDMA write requests in this queue and converts them into DMA transactions by DMA engine 58 on host bus 30. This flow is identical to the way in which NIC 28 typically handles RDMA write requests from network 26 and thus takes advantage of the existing logic in the NIC.

DMA reads by add-on device 32 are similarly handled using the existing RDMA read logic in NIC 28: RDMA logic 50 generates and transmits RDMA read requests over link 40 to a certain queue in NIC logic 56 that is dedicated to these emulated DMA accesses. Packet processing logic 60 processes the RDMA read requests in this queue and converts them into the corresponding DMA read transactions directed by DMA engine 58 over host bus 30 to the designated addresses in system memory 24. Once the data are returned over the bus to the DMA engine, packet processing logic 60 sends the data back to add-on device 32 by transmitting RDMA response packets over link 40. For good performance, it is desirable that the DMA transactions to and from system memory 24 be pipelined. To support pipelining of DMA read transactions, add-on device 32 should have sufficient queue depth to match the responder resources of NIC 28.

MMIO Emulation

Host bus interface 52 includes a range 54 of addresses on host bus 30 that is assigned to NIC 28. On the PCIe bus, for example, this range is defined by the base address register (BAR) of host bus interface 52, and enables other components on bus 30 to perform MMIO write and read transactions to and from addresses in range 54. In the present embodiment, a part 68 of range 54 is assigned for MMIO access to NIC 28, for example by processes running on CPU 22, as is known in the art. Another sub-range 70 within range 54, however, is assigned to add-on device 32. Packet processing logic 56 in NIC 28 translates the transactions on host bus 30 that are directed to the addresses in sub-range 70 into corresponding packets for transmission over packet communication link 40 to add-on device 32.

This translation enables processes running on CPU 22 to access add-on device 32 by emulated MMIO, as though the add-on device were connected directly to bus 30 with its own assigned address range. For example, MMIO writes to the add-on device can be emulated in the following way: Host bus interface 52 captures write transactions on bus 30 that are directed by processes running on CPU 20 to addresses in sub-range 70. In response to these transactions, packet processing logic 60 generates and transmits corresponding RDMA write packets via packet communication link 40 to memory 48 of add-on device 32. By the same token, when host bus interface 52 captures a read transaction directed on bus 30 to an address in sub-range 70, packet processing logic 60 generates and transmits an RDMA read request over link 40 to the corresponding address in memory 48. When add-on device 32 responds to this read request, packet processing logic 60 translates the RDMA read response back into the appropriate bus transaction to return the packet data to CPU 20. Alternatively, NIC 28 may invoke an exchange of RDMA writes with add-on device 32 for this purpose. Additionally or alternatively, NIC 28 can expose some of its own internal memory for purposes of MMIO, to be used as a cache for staging data into and/or out of add-on device 32.

Multi-Channel I/O Interaction

Application processes 62 running on CPU 22 are able to invoke RDMA operations by NIC 28 by submitting work requests to a NIC driver 66, which is a part of the software in an operating system 64 of the host computer. In the present embodiment, NIC driver 66 is extended to support work requests directed to add-on device 32, thus enabling processes 62 to leverage the existing RDMA support and facilities of NIC 28 in order to invoke and interact with the capabilities of computational logic 46. These interactions include transferring data between memory 48 and memory 24, as well as submitting commands to add-on device to perform predefined operations on the data.

Application processes 62 interact with NIC 28 by means of a set of work queues 72, which are posted in memory 24 in the pictured example. (In other implementations, the work queues, as well as completion queues, may reside in the NIC itself.) Each application is assigned one or more queue pairs 74 (including a receive queue and a send queue, as is known in the art) for this purpose. When one of application processes 62 submits a work request to NIC driver 66, the driver posts a work item, referred to as a work queue element (WQE), in the appropriate queue 74. The WQE specifies the type of operation to be carried out by NIC 28 (for example, RDMA read or write) and a scatter or gather list, specifying an address or addresses in a data region 78 of memory 24 to or from which DMA engine 58 is to write or read the data. NIC driver 66 assigns memory regions and memory keys to application processes 62, and NIC logic 56 checks and uses these keys in executing the WQEs in queues 74, in order to ensure that each application is able to access only its assigned region in memory 24.

To carry out the network operations requested by application processes 62, DMA engine 58 reads the WQEs from queues 74 in turn, and packet processing logic 60 generates packets accordingly for transmission via network port 34 to network 26. As a part of these RDMA operations, DMA engine 58 reads data from and/or writes data to the designated addresses in data region 78 of memory 24. Scheduling logic 61 arbitrates among the different queues 74 and associated tasks, and assigns resources of NIC 28 accordingly. In this regard, scheduling logic 61 may apply different priorities to different queues and tasks, and thus enforce a predefined QoS policy.

NIC 28 maintains a set of completion queues 80 for purposes of reporting to application processes 22. Upon completion of a requested operation by NIC 28, DMA engine 58 writes a completion report, known as a completion queue element (CQE), to an assigned completion queue 82. Application processes 62 poll their assigned completion queues 82 in order to determine when the work requests that they submitted have been completed.

In some embodiments of the present invention, NIC driver 66 is modified to enable applications 62 to use these existing facilities in NIC 28 to invoke and track operations by add-on device 32, as well. Little or no modification of NIC 28 is required for this purpose. The work queues 72 created in memory 24 by driver 66 are supplemented with one or more additional queues 76 containing work items (WQEs) specifying operations to be performed by add-on device 32. DMA engine 58 reads the WQEs from these queues 76, and packet processing logic 60 handles their execution in a similar manner to the WQEs in queues 74. Execution of the WQEs in queues 76, however, causes packet processing logic 60 to transmit packets via port 36 over packet communication link 40, rather than via port 34 to network 26. Receipt of these packets by RDMA logic 50 then causes computational logic 46 to perform the desired operations. These operations may be specified, for example, in the payloads of the packets or by the WQEs themselves.

When there are two or more queues 76 containing different, respective WQEs directed to add-on device 32, scheduling logic 61 will transmit the packets corresponding to these WQEs in accordance with predefined scheduling criteria. These scheduling criteria may be chosen (using the existing capabilities of NIC 28) so as to apply different, respective QoS levels to the different queues. In this manner, driver 66 can prioritize the tasks to be performed by add-on device 32 in accordance with policies set by the user of system 20. A certain high-priority channel can be dedicated to urgent communications with the add-on device if desired. Furthermore, the memory protection facilities of NIC 28 (such as the enforcement of distinct memory regions and memory keys) can be applied to queues 76 in order to ensure that segregation is maintained between the address spaces of different application processes 62 in their interaction with add-on device 32.

Using multiple RDMA channels of NIC 28 to interact with add-on device 32 can provide significant additional benefits: For example, virtualization can be achieved by assigning different RDMA channels to different guest processes running in software on the CPU 22, and built-in SR-IOV capabilities of NIC 28 can be applied in controlling add-on device 32. Multiple command channels can then be instantiated on add-on device 32, each assigned to a different SR-IOV virtual function. Additionally or alternatively, using multiple RDMA channels between NIC 28 and add-on device 32 can be helpful in parallelizing transactions and making use of the full available bandwidth of bus 30 in passing data to and from add-on device 32.

Add-on logic 44 in device 32 can also be configured so that upon completion of a specified operation, RDMA logic 50 transmits a reporting message over packet communication link 40. This reporting message may comprise one or more RDMA send packets, for example. Upon receipt of this message in NIC 28, packet processing logic 60 instructs DMA engine 58 to post a CQE in a completion queue 84 in system memory 24 that is assigned to add-on device 32. Completion queue 84 is accessed by the software processes running on CPU 22 in the same manner as completion queues 82. Alternatively, the reporting message may comprise an RDMA write transaction, which updates memory 24 with the completion status of the operation. Software processes running on CPU 22 may poll this memory location directly.

Alternative Topologies

Figure 2:
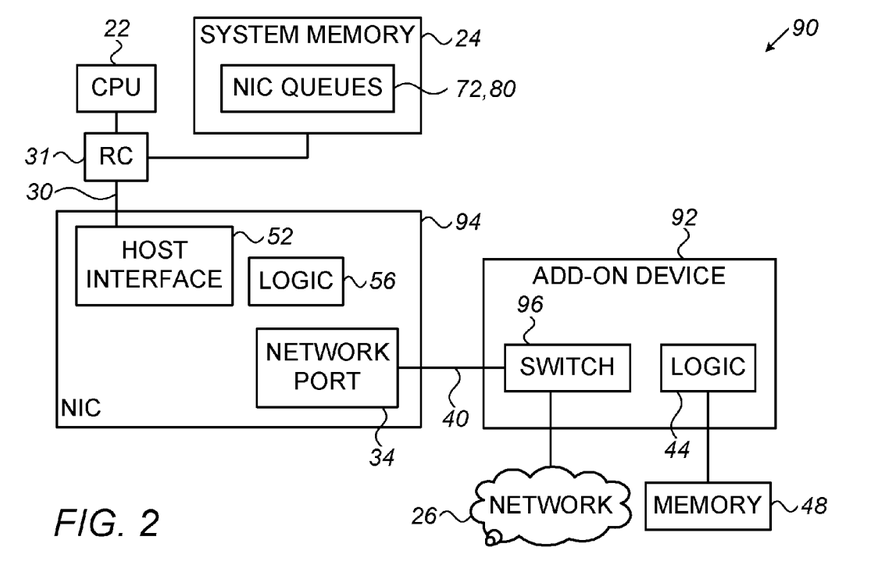
FIGS. 2 and 3 are block diagrams that schematically illustrate computer systems that include add-on devices, in accordance with alternative embodiments of the invention.

FIG. 2 is a block diagram that schematically illustrates a computer system 90 that includes an add-on device 92, in accordance with an alternative embodiment of the invention. The operation of system 90 is similar to that of system 20, as described above in detail, except that access to network 26 is via add-on device 92. Therefore, a NIC 94 in system 90 requires only the single network port 34 to communicate over packet communication link 40 with both the add-on device and the network. Alternatively, the NIC may have multiple network ports connecting to add-on device 92 or to other links.

To support this functionality, add-on device 92 comprises a switch 96, which is coupled between network port 34 of NIC 94 and add-on logic 44. Switch 96 has multiple ports (not shown in the figure), including a port connecting to packet communication link 40, another port connecting to network 26 via another packet communication link, and a port connecting to add-on logic 44. Based on the packet headers, switch 96 decides whether to convey the packets that it receives over packet communication link 40 from NIC 94 to network 26 or to add-on logic 44.

Figure 3:
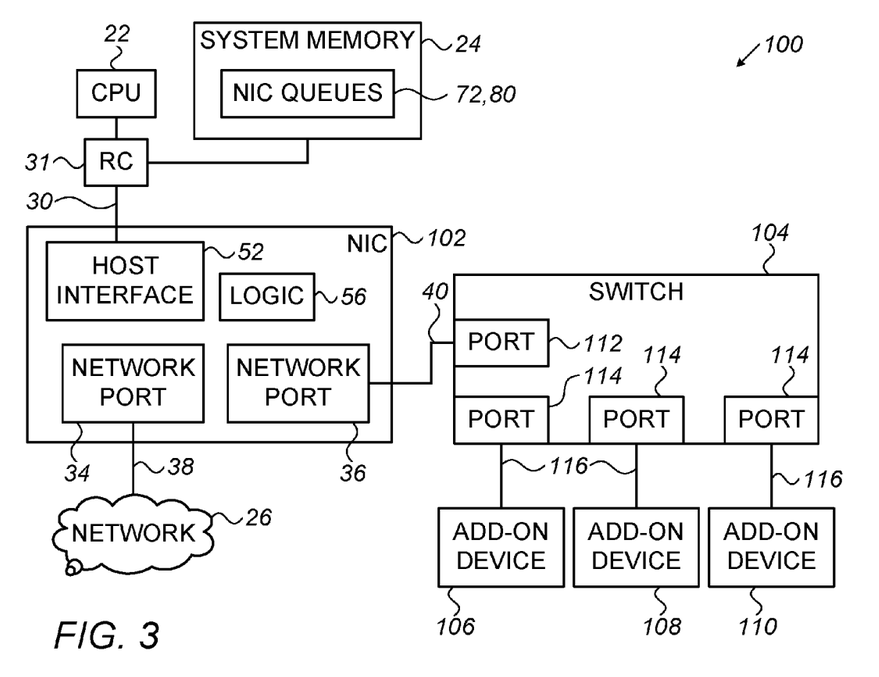

FIG. 3 is a block diagram that schematically illustrates a computer system 100 that includes multiple add-on devices 106, 108, 110, in accordance with yet another embodiment of the invention. A NIC 102 operates in a manner similar to NIC 28 (FIG. 1), but with queues 72 in system memory 24 that contain WQEs directed to the multiple, different add-on devices. NIC 102 is connected to add-on devices 106, 108, 110 via a switch 104. One port 112 of switch 104 is connected to packet communication link 40. Additional ports 114 are connected via respective packet communication links 116 to add-on devices 106, 108, 110. Alternatively, one or more of ports 114 may be connected to communicate with other sorts of hardware entities.

Example Use Case

Figure 4:
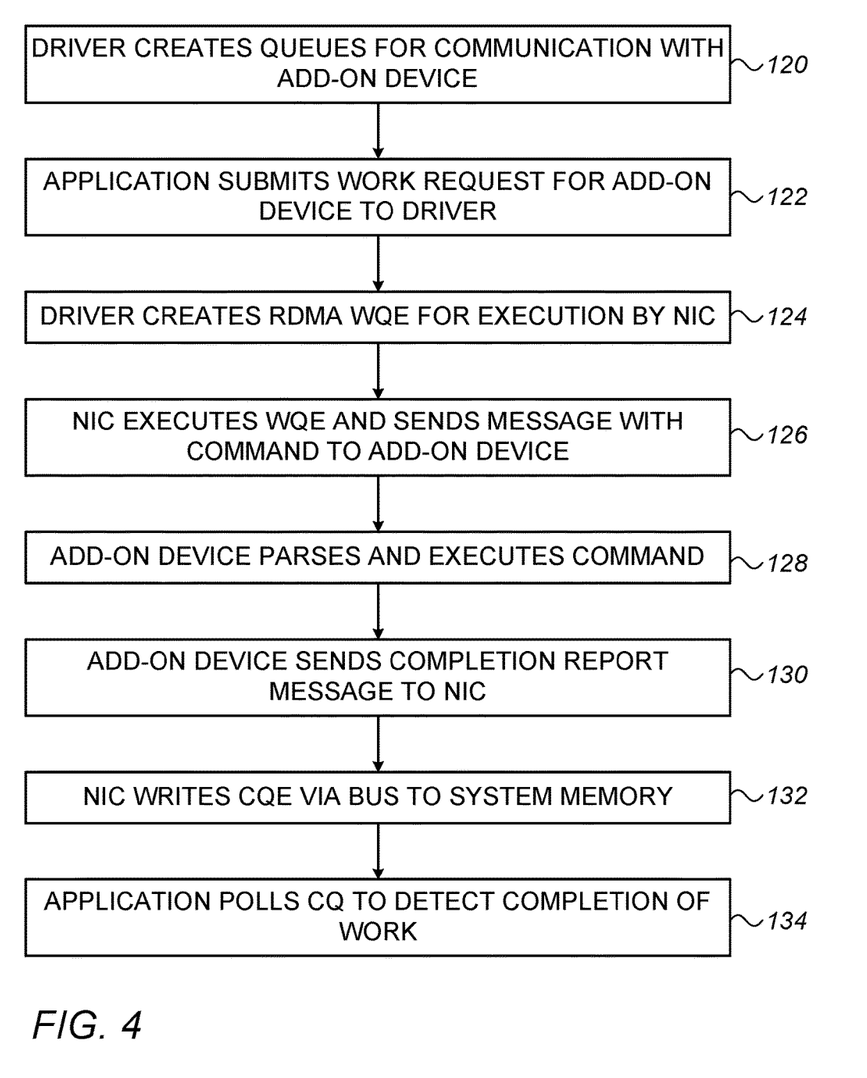
FIG. 4 is a flow chart that schematically illustrates a method for interaction between host software and an add-on device, in accordance with an embodiment of the invention.

FIG. 4 is a flow chart that schematically illustrates a method for interaction between software running on CPU 22 and add-on device 32, in accordance with an embodiment of the invention. For the sake of clarity and concreteness, the description that follows will relate specifically to the elements of system 20 that are shown in FIG. 1. Alternatively, this method may be applied, mutatis mutandis, in other system configurations and topologies that implement the principles described above, such as those shown in FIGS. 2 and 3, as well as other configurations that will be apparent to those skilled in the art after reading the present description.

NIC driver 66 creates queue pairs 76 for use in communicating commands from CPU 22 to add-on device 32, along with at least one completion queue 84 for use in communicating job completion by the add-on device to CPU 22, at a queue creation step 120. Each queue pair includes a send work queue, in which the WQEs represent specific commands to add-on device 32, and a receive work queue, in which WQEs represent buffers to receive messages from add-on device 32.

To send a command to add-on device 32, application process 62 interacts with driver 66, for example, by submitting a suitable work request using a suitable application program interface (API) provided by the NIC driver, in a work request submission step 122. In response to the invocation by the application, driver 66 creates an RDMA WQE for execution by NIC 28, at a WQE creation step 124. The WQE may instruct NIC 28, for example, to send a RoCE packet with a header specifying as its destination the Ethernet media access control (MAC) address of add-on device 32 on packet communication link 40. NIC 28 executes the WQE and packet processing logic 60 transmits the resulting one or more packets via network port 36, at a message transmission step 126.

Add-on logic 44 parses the message and executes the command that it contains, at a command execution step 128. At this step, computational logic 46 will do whatever work is required, for example compressing or encrypting data that is read from a specified address in host memory 24. Upon completion of the operation, RDMA logic 50 sends a response message back to NIC 28 over link 40, at a completion reporting step 130. DMA engine 58 then writes a CQE to completion queue 84 in host memory 24, at a CQE writing step 132. Application process 62 polls for completion on the completion queue in order to know when the job has been completed, and may also inspect the response message content for status information.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Peripheral apparatus for use with a host computer that includes a host bus and host resources, including a host processor, connected to the host bus, the apparatus comprising:
   a packet communication link having first and second ends;
   an add-on device, which comprises:
      a first network port coupled to the first end of the packet communication link; and
      add-on logic, which is configured to receive and transmit packets containing data over the packet communication link and to perform computational operations on the data; and
   a network interface controller (NIC), which comprises:
      a host bus interface, configured for connection to the host bus;
      a second network port, coupled to the second end of the packet communication link; and
      packet processing logic, which is coupled between the host bus interface and the second network port, and is configured to translate between the packets transmitted and received over the packet communication link and transactions executed on the host bus so as to provide access between the add-on device and the host resources,
   wherein the host resources comprise a system memory, and wherein the NIC comprises a direct memory access (DMA) engine, which is configured to write and read data to and from the system memory via the host bus, including the data in the packets transmitted from the add-on device over the packet communication link.

2. Peripheral apparatus for use with a host computer that includes a host bus and host resources, including a host processor, connected to the host bus, the apparatus comprising:
   a packet communication link having first and second ends;
   an add-on device, which comprises:
      a first network port coupled to the first end of the packet communication link; and
      add-on logic, which is configured to receive and transmit packets containing data over the packet communication link and to perform computational operations on the data; and
   a network interface controller (NIC), which comprises:
      a host bus interface, configured for connection to the host bus;
      a second network port, coupled to the second end of the packet communication link;
      packet processing logic, which is coupled between the host bus interface and the second network port, and is configured to translate between the packets transmitted and received over the packet communication link and transactions executed on the host bus so as to provide access between the add-on device and the host resources; and
      a third network port, which is configured to convey communications between the host computer and a packet data network while the second network port communicates with the add-on device over the packet communication link.

3. Peripheral apparatus for use with a host computer that includes a host bus and host resources, including a host processor, connected to the host bus, the apparatus comprising:
   a packet communication link having first and second ends;
   an add-on device, which comprises:
      a first network port coupled to the first end of the packet communication link; and
      add-on logic, which is configured to receive and transmit packets containing data over the packet communication link and to perform computational operations on the data; and
   a network interface controller (NIC), which comprises:
      a host bus interface, configured for connection to the host bus;
      a second network port, coupled to the second end of the packet communication link; and
      packet processing logic, which is coupled between the host bus interface and the second network port, and is configured to translate between the packets transmitted and received over the packet communication link and transactions executed on the host bus so as to provide access between the add-on device and the host resources,
   wherein the add-on device comprises a switch, which is coupled between the first network port and the add-on logic, and is configured to convey communications, transmitted and received via the second network port, between the host computer and a packet data network, while transferring the packets to and from the add-on logic.

4. Peripheral apparatus for use with a host computer that includes a host bus and host resources, including a host processor, connected to the host bus, the apparatus comprising:
- a packet communication link having first and second ends;
- an add-on device, which comprises:
  - a first network port coupled to the first end of the packet communication link; and
  - add-on logic, which is configured to receive and transmit packets containing data over the packet communication link and to perform computational operations on the data;
- a network interface controller (NIC), which comprises:
  - a host bus interface, configured for connection to the host bus;
  - a second network port, coupled to the second end of the packet communication link; and
  - packet processing logic, which is coupled between the host bus interface and the second network port, and is configured to translate between the packets transmitted and received over the packet communication link and transactions executed on the host bus so as to provide access between the add-on device and the host resources; and
- a switch, which comprises:
  - a third port, which is connected to the first end of the packet communication link;
  - a fourth port, which is connected to communicate with the first port of the add-on device; and
  - a fifth port, which is connected to communicate with another entity over a further packet communication link.

5. The apparatus according to claim 1, wherein the first and second network ports are configured to transmit the packets over the packet communication link in accordance with an Ethernet protocol.

6. The apparatus according to claim 1, wherein a range of addresses on the host bus is assigned to the host bus interface, and a sub-range within the assigned range is assigned to the add-on device, and wherein the packet processing logic is configured to translate the transactions on the host bus that are directed to the addresses in the sub-range into corresponding packets for transmission over the packet communication link to the add-on device.

7. The apparatus according to claim 1, wherein the add-on logic and the packet processing logic are configured to transmit and receive the packets over the packet communication link in accordance with a remote direct memory access (RDMA) protocol, which specifies addresses in the system memory to and from which the data in the packets are to be written and read by the DMA engine.

8. Peripheral apparatus for use with a host computer that includes a host bus and host resources, including a host processor, connected to the host bus, the apparatus comprising:
- a packet communication link having first and second ends;
- an add-on device, which comprises:
  - a first network port coupled to the first end of the packet communication link; and
  - add-on logic, which is configured to receive and transmit packets containing data over the packet communication link and to perform computational operations on the data; and
- a network interface controller (NIC), which comprises:
  - a host bus interface, configured for connection to the host bus;
  - a second network port, coupled to the second end of the packet communication link; and
  - packet processing logic, which is coupled between the host bus interface and the second network port, and is configured to translate between the packets transmitted and received over the packet communication link and transactions executed on the host bus so as to provide access between the add-on device and the host resources,
- wherein the host resources comprise a system memory, and wherein the packet processing logic is configured to read and execute work items posted in work queues in the system memory by software processes running on the host computer, including at least one queue containing add-on work items specifying operations to be performed by the add-on device, wherein execution of the add-on work items causes the packet processing logic to transmit, over the packet communication link, at least one packet that causes the add-on logic to perform the specified operations.

9. The apparatus according to claim 8, wherein the at least one queue comprises two or more queues containing different, respective add-on work items directed to the add-on device, and wherein the NIC comprises scheduling logic, which is configured to transmit the packets corresponding to the work items in the two or more queues in accordance with predefined scheduling criteria.

10. The apparatus according to claim 9, wherein the scheduling criteria comprise different, respective levels of quality of service that are assigned to the two or more queues.

11. The apparatus according to claim 8, wherein the add-on logic is configured, upon completion of the specified operations, to transmit a reporting message over the packet communication link, and wherein the NIC logic is configured, in response to the reporting message, to post a completion item in a completion queue in the system memory, to be accessed by the software processes running on the host processor.

12. The apparatus according to claim 8, wherein the add-on logic is configured, upon completion of the specified operations, to write a completion status to the system memory using a remote direct memory access (RDMA) protocol.

13. A computing method, comprising:
- connecting a first network port of an add-on device to a second network port of a network interface controller (NIC) via a packet communication link;
- connecting a host bus interface of the NIC to a host bus of a host computer comprising host resources, including a host processor, connected to the host bus;
- in the add-on device, receiving and transmitting packets containing data from and to the NIC over the packet communication link and performing computational operations on the data; and
- translating, in the NIC, between the packets transmitted and received over the packet communication link and transactions executed on the host bus so as to provide access between the add-on device and the host resources,
- wherein the host resources comprise a system memory, and wherein translating between the packets and the transactions comprises writing and reading the data in the packets transmitted from and to the add-on device over the packet communication link to and from the system memory via the host bus using a direct memory access (DMA) engine in the NIC.

14. A computing method, comprising:
connecting a first network port of an add-on device to a second network port of a network interface controller (NIC) via a packet communication link;
connecting a host bus interface of the NIC to a host bus of a host computer comprising host resources, including a host processor, connected to the host bus;
in the add-on device, receiving and transmitting packets containing data from and to the NIC over the packet communication link and performing computational operations on the data;
translating, in the NIC, between the packets transmitted and received over the packet communication link and transactions executed on the host bus so as to provide access between the add-on device and the host resources; and
conveying communications between the host computer and a packet data network via a third network port of the NIC while the second network port communicates with the add-on device over the packet communication link.

15. The method according to claim 13, wherein the add-on device comprises a switch, which is coupled between the first network port and the add-on logic, and wherein the method comprises conveying communications via the second network port and the switch between the host computer and a packet data network, while transferring the packets via the switch to and from the add-on logic.

16. The method according to claim 13, wherein connecting the first network port comprises connecting the packet communication link between the second network port of the NIC and a third port of a switch while connecting a fourth port of the switch to communicate with the first port of the add-on device, and
wherein the method comprises connecting a fifth port of the switch to communicate with another entity over a further packet communication link.

17. The method according to claim 13, wherein receiving and transmitting the packets comprises conveying the packets over the packet communication link in accordance with an Ethernet protocol.

18. A computing method, comprising:
connecting a first network port of an add-on device to a second network port of a network interface controller (NIC) via a packet communication link;
connecting a host bus interface of the NIC to a host bus of a host computer comprising host resources, including a host processor, connected to the host bus;
in the add-on device, receiving and transmitting packets containing data from and to the NIC over the packet communication link and performing computational operations on the data; and
translating, in the NIC, between the packets transmitted and received over the packet communication link and transactions executed on the host bus so as to provide access between the add-on device and the host resources,
wherein a range of addresses on the host bus is assigned to the host bus interface, and wherein the method comprises assigning a sub-range within the assigned range to the add-on device, and
wherein translating between the packets and the transactions comprises translating the transactions on the host bus that are directed to the addresses in the sub-range into corresponding packets for transmission over the packet communication link to the add-on device.

19. The method according to claim 13, wherein receiving and transmitting the packets comprises exchanging the packets over the packet communication link between the add-on device and the NIC in accordance with a remote direct memory access (RDMA) protocol, which specifies addresses in the system memory to and from which the data in the packets are to be written and read by the DMA engine.

20. A computing method, comprising:
connecting a first network port of an add-on device to a second network port of a network interface controller (NIC) via a packet communication link;
connecting a host bus interface of the NIC to a host bus of a host computer comprising host resources, including a host processor, connected to the host bus;
in the add-on device, receiving and transmitting packets containing data from and to the NIC over the packet communication link and performing computational operations on the data; and
translating, in the NIC, between the packets transmitted and received over the packet communication link and transactions executed on the host bus so as to provide access between the add-on device and the host resources,
wherein the host resources comprise a system memory, and wherein the method includes reading and executing in the NIC work items posted in work queues in the system memory by software processes running on the host computer, including at least one queue containing add-on work items specifying operations to be performed by the add-on device,
wherein execution of the add-on work items causes NIC to transmit, over the packet communication link, at least one packet that causes the add-on device to perform the specified operations.

21. The method according to claim 20, wherein the at least one queue comprises two or more queues containing different, respective reading and executing the work items comprises applying scheduling logic in the NIC to transmit the packets corresponding to the work items in the two or more queues in accordance with predefined scheduling criteria.

22. The method according to claim 21, wherein the scheduling criteria comprise different, respective levels of quality of service that are assigned to the two or more queues.

23. The method according to claim 20, and comprising, upon completion of the specified operations in the add-on device, transmitting a reporting message from the add-on device over the packet communication link to the NIC, and
wherein translating the packets comprises, in response to the reporting message, posting a completion item from the NIC to a completion queue in the system memory, to be accessed by the software processes running on the host processor.

24. The method according to claim 20, and comprising, upon completion of the specified operations in the add-on device, writing a completion status from the add-on device to the system memory using a remote direct memory access (RDMA) protocol.

* * * * *